United States Patent [19]
Fitzgerald et al.

[11] 3,887,030
[45] June 3, 1975

[54] DUCT SYSTEMS FOR AIR CUSHION VEHICLES

[76] Inventors: Christopher John Fitzgerald, 6 A'Beckett St., Coburg, Australia, 3058; Robert Keith Wilson, 176 Woods St., West Newport, Australia, 3015

[22] Filed: Dec. 11, 1973

[21] Appl. No.: 423,796

[30] Foreign Application Priority Data
Dec. 15, 1972  Australia............................ 1647/72
July 2, 1973    Australia............................ 3886/73

[52] U.S. Cl............................... 180/121; 180/116
[51] Int. Cl............................................... B60v 1/14
[58] Field of Search............ 180/116, 119, 121, 127

[56] References Cited
UNITED STATES PATENTS

| | | | |
|---|---|---|---|
| 3,208,543 | 9/1965 | Crowley............................ | 180/121 |
| 3,243,003 | 3/1966 | Woltering....................... | 180/127 X |
| 3,263,764 | 8/1966 | Bertin............................... | 180/121 |
| 3,401,766 | 9/1968 | Laufman........................... | 180/119 |
| 3,429,395 | 2/1969 | Beardsley........................ | 180/127 X |
| 3,486,577 | 12/1969 | Jackes............................. | 180/120 |
| 3,561,559 | 2/1971 | Delamare........................ | 180/121 X |
| 3,563,333 | 2/1971 | Beardsley........................ | 180/127 X |
| 3,608,662 | 9/1971 | Ferguson......................... | 180/116 X |
| 3,709,318 | 1/1973 | Ferguson......................... | 180/116 |
| 3,730,298 | 5/1973 | Schouw............................ | 180/126 |

FOREIGN PATENTS OR APPLICATIONS
1,521,649  3/1968  France............................... 180/121
2,028,559  12/1970 Germany........................... 180/121

*Primary Examiner*—David Schonberg
*Assistant Examiner*—Terrance L. Siemens
*Attorney, Agent, or Firm*—Wenderoth, Lind & Ponack

[57] ABSTRACT

An air cushion vehicle comprises a base comprising a platform and an upstanding perimetric wall, a unit removably mounted on the base amidships thereof and including a power supply means, two axial flow fans located on opposite sides of the fore-aft midline of the vehicle and a stator for each fan, two separate and independant duct systems each supplied, in use, by a respective one of the fans and located on opposite sides of the midline, and splitter means adjacent each fan dividing each duct system into a propulsion duct and an air cushion duct. The propulsion ducts extending rearwardly, are positioned laterally closer to the sides of the vehicle than the openings of the air cushion ducts to the fans and converge towards their outlets whereby to pressurize the air cushion ducts. The air cushion ducts extend rearwardly initially and forwardly subsequently, and the rearwardly extending portion includes a diffuser debouching into a chamber of relatively large cross-sectional area intermediate the rearwardly and forwardly extending portions.

18 Claims, 10 Drawing Figures

DUCT SYSTEMS FOR AIR CUSHION VEHICLES

BACKGROUND OF THE INVENTION

1. Field of the Invention

This invention relates to duct systems for air cushion vehicles and to air cushion vehicles.

The system of this invention is particularly but not exclusively suited for air cushion vehicles of the type which utilise a cell or jupe type of flexible skirt for the air cushion system.

In spite of advantages when compared with other vehicles, one of the problems associated with the design and operation of air cushion vehicles lies in the fact that to date they have proved difficult to control both in direction and in stability particularly when the vehicle is very small. It is an object of the present ivnention to provide a ducting system for this type of vehicle, whether small or large which will enable considerable improvement in both directional control and stability.

2. Prior Art

Various constructions of air cushion vehicles which have applicability to small vehicles have been proposed and these include U.S. Pat. Nos. 3,198,274; 3,362,510; 3,486,577; 3,608,662; 3,677,359; 3,718,203; 3,730.298.

However, in many of these, one fan system is used for propulsion and another fan or propellor is used for an air cushion and this results in added complexity, increased centre of gravity height, increased vehicle noise, decreased safety, increased size and volume and weight, and increased vehicle turn difficulties.

Other craft which have used one fan for propulsion and cushion have, however, used common plenum chambers and this has had the effect that air supplied to propulsion and cushion is not ideally suited to the particular purpose but is a compromise between purposes.

SUMMARY OF THE INVENTION

The present invention provides a propulsion and lift system for an air cushion vehicle comprising a plurality of independent duct systems and a corresponding plurality of axial flow fans each adapted to direct an air stream through each of the duct systems; and wherein each of the duct systems is adapted to divide the respective air stream into two components, to direct one of the components to provide a portion of the total propulsive force for the vehicle and to direct the other of the components to the air cushion of the vehicle to provide a portion of the total lifting force.

A specific construction in accordance with this invention will now be described with the aid of the accompanying drawings which are given by way of example only.

DETAILED DESCRIPTION

Figure 1:
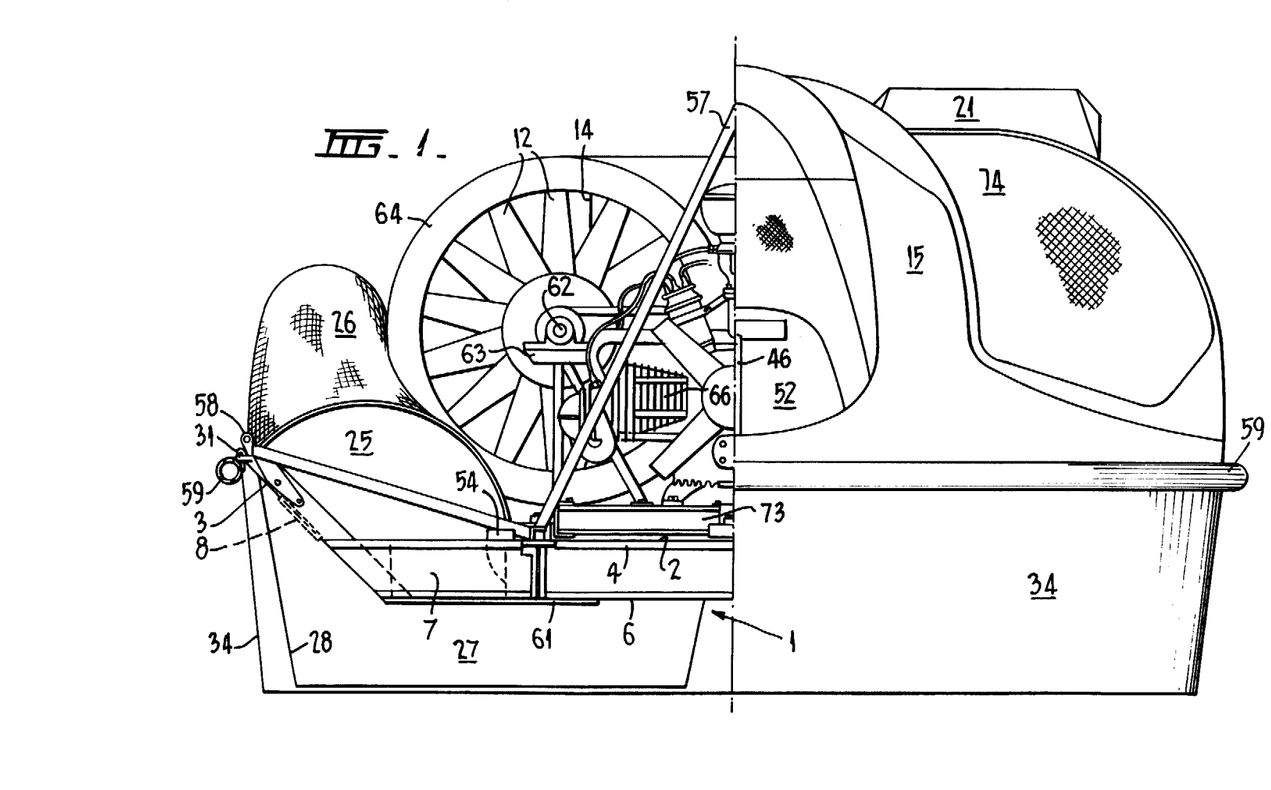
FIG. 1 is a front elevation partly in cross-section of a vehicle in accordance with this invention.
Figure 2:
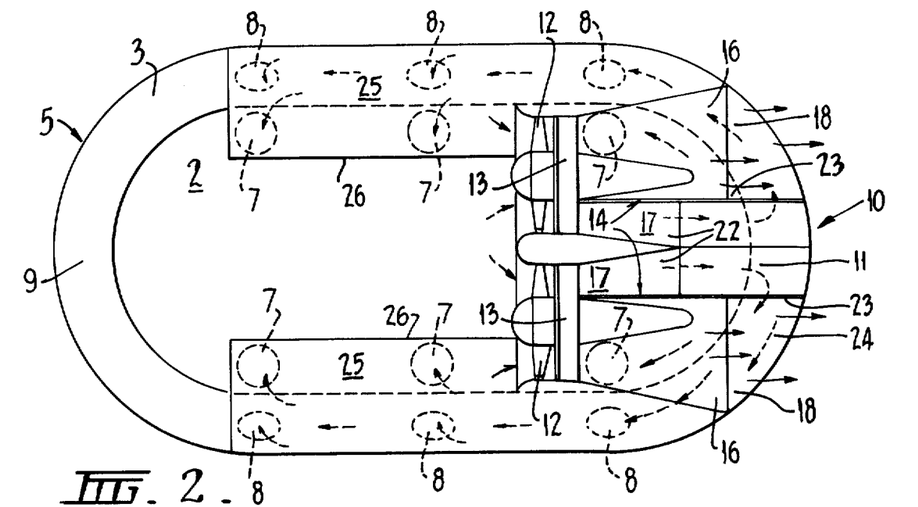
FIG. 2 is a plan view of the vehicle with parts removed for clarity and showing a duct system of the vehicle.
Figure 3:
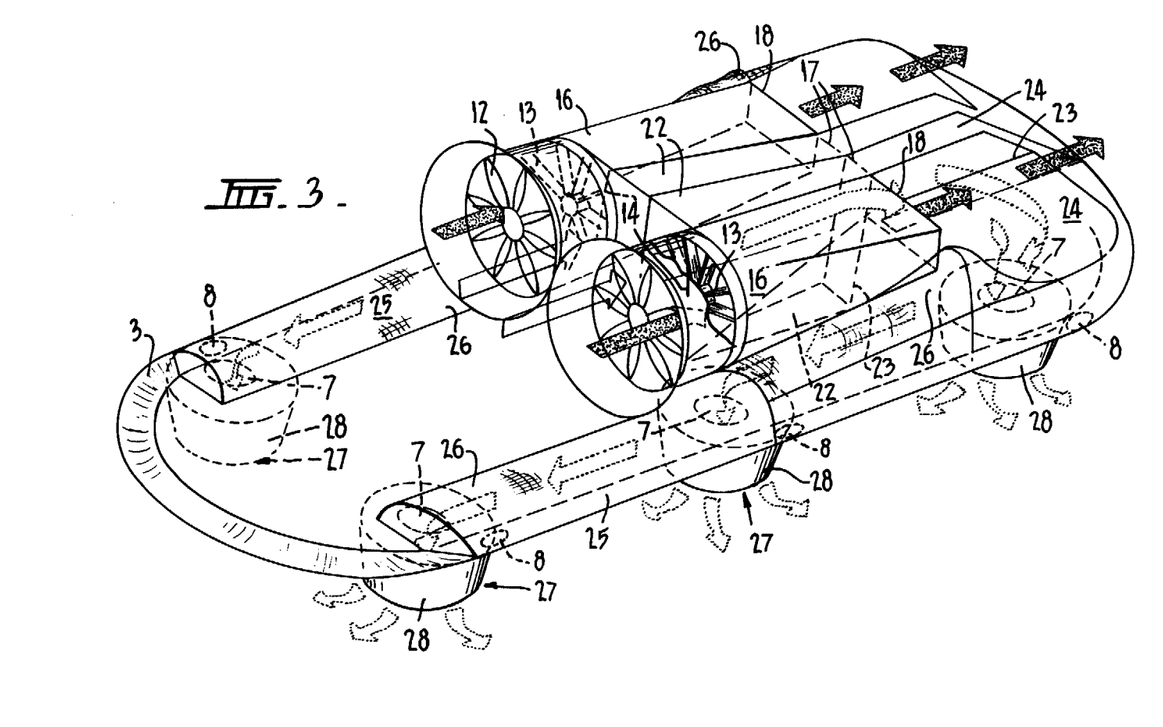
FIG. 3 is an isometric schematic view of the vehicle showing the duct system.
Figure 4:
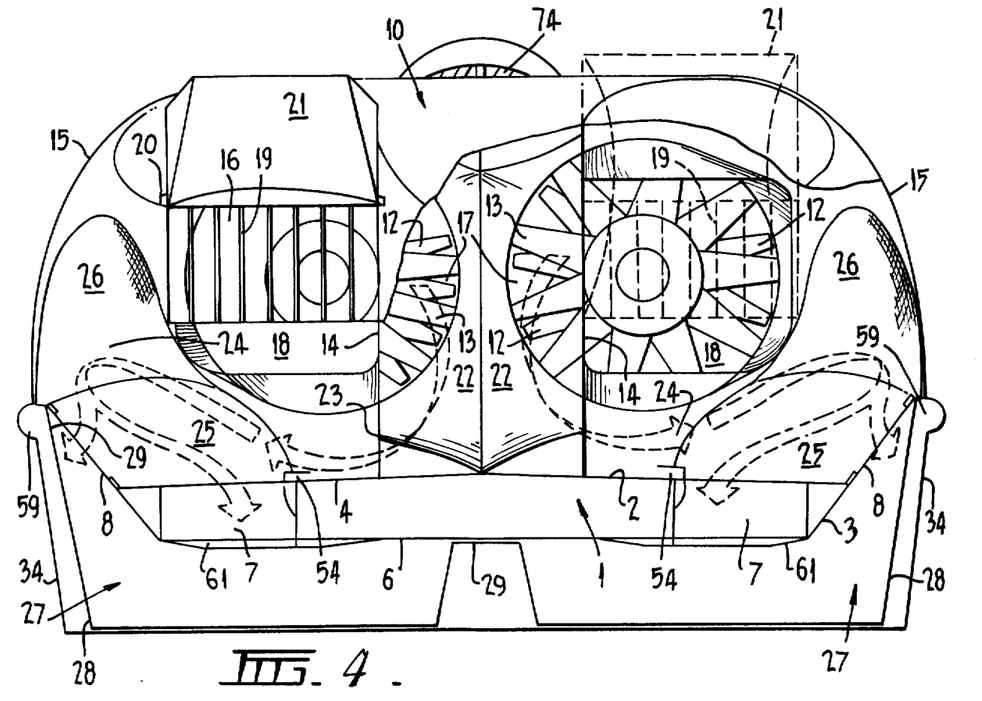
FIG. 4 is a partly cut-away rear view of the vehicle.
Figures 5, 6, 8, 10:
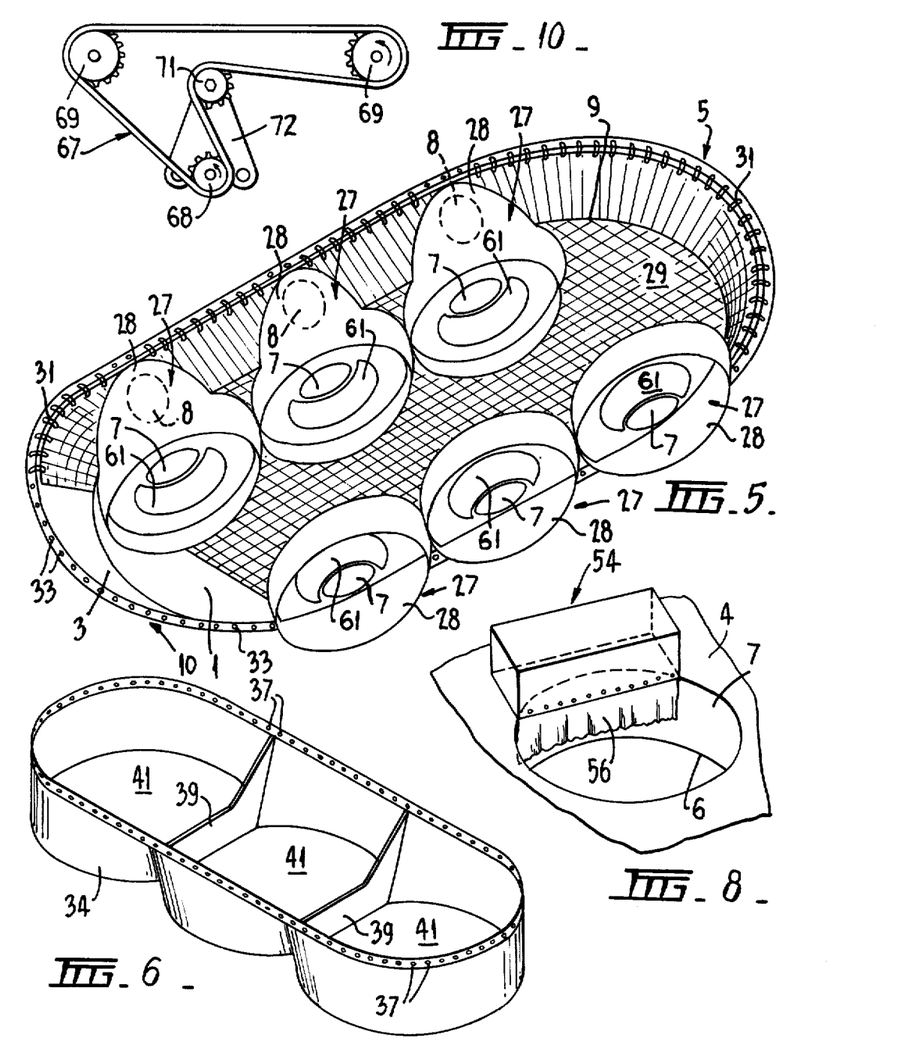
FIG. 5 is an underneath perspective view of the vehicle showing skirts defining a portion of an air cushion of the vehicle.
FIG. 6 is a perspective view of skirts defining another portion of the air cushion of the vehicle.
FIG. 8 is a perspective view showing vent means of the vehicle.
FIG. 10 is a side view showing transmission means of the vehicle.
Figure 7:
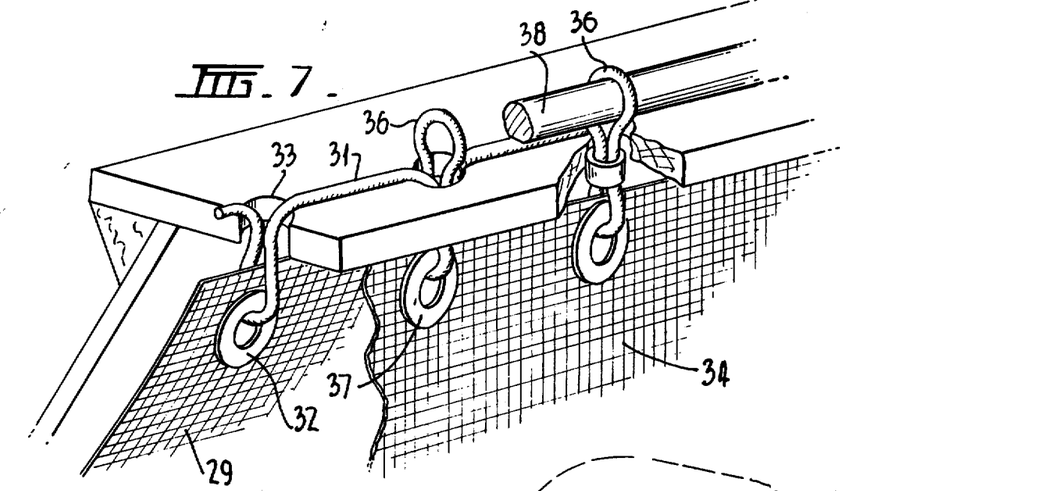
FIG. 7 is a fragmentary view showing attachment of the skirts to the vehicle.
Figure 9:
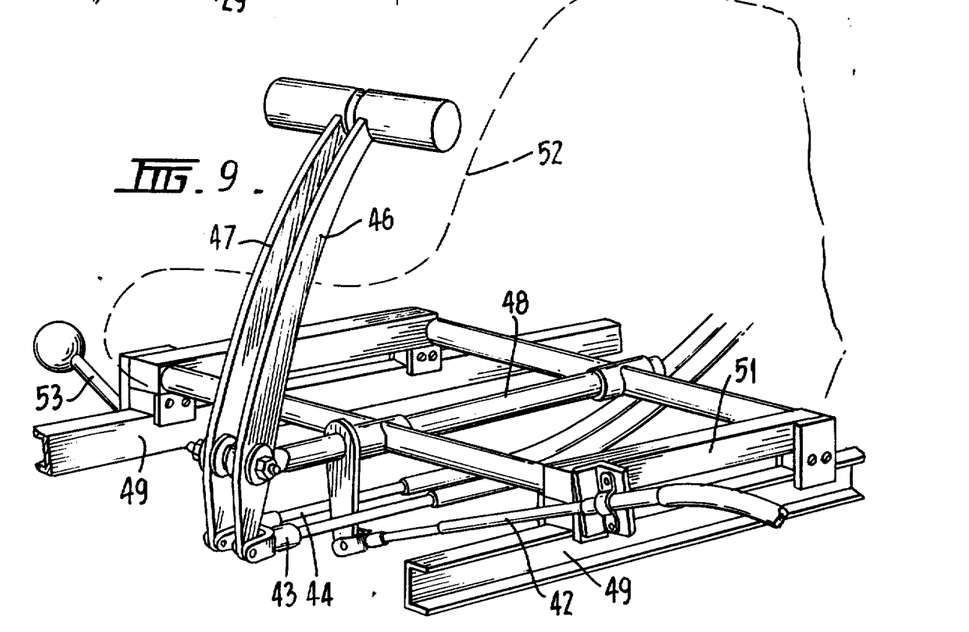
FIG. 9 is a perspective view showing a seat mounting means and control means of the vehicle.

As shown in the drawings the vehicle comprises a base 1 comprising a platform 2 having an upwardly and outwardly projecting wall 3 perimetric thereof.

The platform 2 comprises a foam-filled buoyancy chamber sealed top and bottom by rigid skins 4 and 6 and has apertures 7 therein for supplying the air cushion of the vehicle.

The wall 3 has apertures 8 therein for supplying the air cushion of the vehicle.

The base 1 has semicircular front (9) and rear (11) ends and this semicircular form is present in both the platform 2 and wall 3 so that there are bow 5 and stern 10 sections which are curved as well as inclined. This arrangement provides a bow area which is stiff enough to act as an impact area in the event of a wave penetrating the air cushion and contacting the base and the bow area will act as an impacting surface and force the vehicle upward on initial impact thus lessening the severity of any following impacts.

The base 1 is sufficiently rigid and strong enough to act as a mounting base for all other systems in the vehicle and is also large enough in volume to provide a buoyancy force of one and one half times the all-up weight of the vehicle.

A propulsion and lift system for the vehicle comprises a pair of axial flow fans 12 mounted on the base which supply air via stators 13 to the duct system which comprises two splitter blades 14.

The stators 13 remove at least part of the swirl component from the air flow of the axial flow fans thus preventing large air turbulence losses within the duct system particularly in the region of the splitter blades 14. The stators 13 also serve to reduce the difficulty of cyclic fan-blade loading which could be induced by operation of the fans in close proximity to a bluff obstruction such as the splitter blades 14.

The duct system of the vehicle comprises a portion mounted to one side of the vehicle and a portion mounted to the opposite side of the vehicle and, apart from being mirror images, those portions are identical.

The two portions of the duct system are each supplied by one of the fans 12 and each of the portions comprises a propulsion duct 16 and an air cushion supply duct 17 which are separated from each other by the splitter blades 14.

The splitter blades 14 may be made movable so as to vary the relationship between the portion of the air directed to propulsion ducts 16 and air cushion supply ducts 17 but this is not necessary and it has been found more practical to use fixed splitter blades 14.

Considering firstly the propulsion ducts 16, it will be apparent that the thrust air proceeds directly through these ducts 16 which are short, straight and contract in cross-sectional area towards their outlets 18 where they provide the propulsive force for the vehicle. It is to be noted that the contraction area of the propulsion ducts 16 is such as to provide the correct static pressure for cushion inflation purposes at the inlet to the air cushion supply ducts 17.

Cascade blading 19 is provided in each outlet and is operable by control means to be discussed below. The cascade blading 19 is mounted for pivoting about a vertical axis to provide a turning moment for directional or trim control of the vehicle. It is to be noted that the outlets 18 are located at the rear of the vehicle and thus a particularly effective turning moment will be produced. Further, since cascade blading is used rather than an isolated aerofoil blading substantially the whole of the air stream will be deflected rather than only a small part of it.

Each outlet 18 is also provided with an air scoop 21 which is operable by the control means described below. The air scoops 21 are mounted for independant pivotal movement about a horizontal axis from an "up" position in which the vehicle proceeds, if both scoops are "up," in a forward direction without any impedance by the respective scoop 21 of the thrust air, to a "down" position in which the respective scoop 21 enters the stream of thrust air and reverses its direction of flow. This will have a braking effect when both scoops 21 are "down." Scoops 21 pivot about pivots 20.

The outlets 18 are spaced out from the vehicle foreaft midline and when one scoop 21 is "up" and the other scoop 21 is "down" an appreciable turning moment is generated due to differential thrust. With appropriate setting of the scoops 21 it is possible to turn the vehicle through 360° without producing any forward or rearward thrust.

Thus it will be seen that the scoops 21 are particularly effective at providing yaw control at zero or partial forward thrust whereas the cascade blading 19 is particularly effective at providing yaw control with forward thrust.

In a modification of the above cascade blading 19 is mounted for pivoting about a horizontal axis for control of longitudinal trim and the scoops 21 are mounted for pivoting about a vertical axis to obtain a braking or turning effect.

The air stream in each of the air cushion supply ducts 17 is initially directed towards the rear of the vehicle and passes through a diffuser 22 to reduce the velocity thereof while keeping loss of static pressure to a minimum. After passing through the diffuser 22 the air stream is led around an abrupt corner 23 into a chamber 24 having a substantially large cross-sectional area. Such velocity reduction before a change in direction reduces large pressure losses associated with high velocity abrupt air flow direction changes even though the corner 23 is aerodynamically rough. Further, a particular advantage is that rough corners are easier to construct than smooth corners and hence construction expenses can be kept lower. Further, it enables what otherwise would be bulky ducting to be installed in a compact form.

From the chamber 24 the air stream passes to the apertures 7 and 8 via, in the case of those apertures 7 and 8 which are relatively forward, a duct 25 formed by the platform 2, wall 3 and a flexible material covering 26.

It is to be noted that none of the two propulsion ducts 16 and the two air cushion supply ducts 17 are interconnected at any point between their inlets and their respective outlets and thus flow rates and pressures in each duct are substantially independant of flow conditions in other ducts.

The apertures 7 and 8 feed the air cushion.

The air cushion is defined by an inner skirt system and an outer skirt system.

The inner skirt system comprises a number of jupes 27. The jupes 27 are formed by flexible skirts 28 which depend from a sheet of flexible material 29. The sheet 29 covers the underside of the base 1 and is drawn taught thereover and thereagainst so as to hold the skirts 28 in a proper vertical and horizontal position related to the vehicle.

The sheet 29 extends to the extremities of the vehicle and is fastened by lashing 31 passing through eyelets 32 and holes 33 in the upper end of the wall 3 which, it will be realized, is elevated and well away from the corrosive and erosive environment which exists under the base 1 and thus the fastening of the sheet 29 to the base 1 is less susceptible to damage from corrosion, erosion or impact. A further advantage is that the fastening is easy to get at and there is no under-hull fastening and thus the sheet 29 can be released or adjusted in tension without having to have access to the underside of the base. A still further advantage is that the sheet 29 has an ability to deflect or deform on impact and it is much less prone to damage than an alternative system in which the skirts 28 are fixed about the apertures 7 and 8. A particular advantage is that it protects base 1.

It is to be noted that the jupes 27 extend as far as possible towards the lateral extremities of the vehicle so as to give the maximum lateral stability of the vehicle for given lateral pressure differential. The jupes 27 and sheet 29 are shaped to fit the contour of the base 1.

The outer skirt system comprises a perimetric skirt 34 of flexible material which is fastened to the upper end of the wall 3 by means of cords 36 which pass through eyelets 37 and the holes 33 and co-operate with a rod or rods 38. This form of fastening has similar advantages to those discussed with respect to the sheet 29.

The skirt 34 has a taper towards the centre of the vehicle so that the least cushion area is at the bottom of the skirt 34 and this together with the semicircular form at bow 5 and stern 10 gives stability to the cushion when inflated.

Two diaphragms 39 of flexible material are fastened across the skirt 34 and thus tie one side of skirt 34 to the other. These diaphragms 39 help to prevent outward billowing of the skirt 34 but, more importantly, they restrict flow of cushion air longitudinally of the vehicle as is discussed below. Further, the diaphragms 39 divide the air cushion, as defined by the skirt 34, into three cells 41 formed of arc segments of approximately the same radius as that of the bow and stern ends of the skirt 34.

It is to be noted that the jupes 27 on one side of the vehicle and the jupes 27 on the other side of the vehicle are independantly supplied and that the air cushion in cells 41 and external of jupes 27 is supplied only from leakage at the bottom periphery of the jupes 27. Lateral or roll stability is thus mainly dependant on the differences in pressure, and hence lift, between the two cushion supply ducts 17. The limiting pressure differential will occur when the static pressure in the jupes 27 on one side of the vehicle is equal to the fan total pressure and the static pressure in the jupes 27 on the other side of the vehicle is equal to the pressure of the air cushion in cells 41 external of the jupes on that other side. As the fan total pressure in operation is greater than such pressure of the air cushion, the lateral stability moment is large. Longitudinal or pitch stability is provided by the pressure differentials which will occur due to the pressure of cells 41 and jupes 27. The pressure differentials longitudinally are not as large as laterally, but, due to the greater distance between the centre of pressure of the bow cell 41 and jupes 27, the stern cell 41 and jupes 27 and the middle cell 41 and jupes 27, the longitudinal stabilizing moment is similar to the lateral stabilizing moment.

The duct system of the above described construction has a number of other advantages among which are that air cushion and propulsion are not a substantial compromise between the requirements for each and air for cushion is slowed by the diffuser 22 and chamber 24 to be suitable for cushion air whereas air for propulsion is not slowed and is particularly suitable therefor. Because of the forwardly facing fans advantage may be taken of "ram air" due to forward motion of the vehicle and, further, the duct system is particularly uncomplicated. Still further, the duct system may be constructed to offer a low profile so as to reduce drag and to lower the centre of gravity of the vehicle. In addition, the duct system can be designed to enable all rotating machinery to be compacted into a low profile which leads to improvements in safety, noise pollution, aesthetic appeal and a low thrust line.

The aforesaid cascade blading 19 and scoops 21 are operable by control means which includes a push-pull cable 42 for operating both sets of blading 19 and push-pull cables 43 and 44 for operating, independantly, a respective one of the scoops 21. The cables 42-44 are themselves operable by levers 46 and 47 which are mounted on a shaft 48 for left or right movement to operate cable 42 or, individually, forward and aft movement to operate, respectively, cables 43 or 44.

The control system is arranged to give a logical sense of control motion and resulting control effect. A forward movement of levers 46 and 47 increases forward thrust by putting scoops 21 in the "up" position while a rearward movement thereof gives a braking effect by putting the scoops 21 in the "down" position. Differential fore-aft movement of the levers 46 and 47 will give a turning effect. A lateral movement of the levers 46 and 47 to the right produces a turning effect to the right and a lateral movement to the left produces a turning effect to the left.

Two seat rails 49 are mounted to the base 1 and carry a seat and control means supporting frame 51. A seat 52 is positioned on frame 51 and it will be observed that the levers 46 and 47 and shaft 48 are also mounted on frame 51. The frame 51 is movable fore and aft the vehicle and in so doing levers 46 and 47 move with it and maintain a constant relation to the seat 52. The rails 49 are of sufficient length to enable the frame 51, seat 52, levers 46 and 47 and an operator to move fore and aft of the vehicle so that trim control can be achieved without the need for additional trimming weights or devices. Lock means to lock the frame 51 in a desired position on rails 49 is operable by means of lever 53.

To prevent the accumulation of water in the vehicle the platform is cambered on its upper surface so that water runs to drainage apertures 54. The drainage apertures 54 feed to the cushion via apertures 7 and in order to prevent air loss from the cushion and spray generation they are fitted with a flexible flap 56 which is hinged at the top of each aperture 54 and placed so the under water free conditions it is forced against the apertures 7 by air pressure. Buildup of water in the apertures 7 will build up pressure to deflect the flap to allow drainage and, in addition, a venturi effect will also tend to draw water through the apertures 54.

A roll-bar 57 is provided for the vehicle and reinforced lift points 58, each capable of supporting one half of the all-up weight of the vehicle are provided at the sides and stern of the vehicle. These lift points 58 are arranged so that they constitute convenient lifting or towing points. An inflatable bumper 59 is provided around the perimeter of the vehicle and is an effective barrier against structural damage caused by low-speed collisions with obstacles.

Supports for the vehicle which are skid pads 61 sheathed with abrasive resistant material are fastened to the underside of the platform 2 in the region of the apertures 7 and serve to protect the underside of the platform in regions other than those covered by sheet 29 from abrasion. It is to be noted that the pads 61 are so located and sized that in no position that the skirts 28 and 34 may take up will those skirts underlie the pads 61 so as to avoid damage to those skirts when landing.

The fans 12 are of low tip speed and hence low noise type and are mounted on drive shafts which are held at the rear by bearings, each supported by three radial struts and at the front by bearings 62 mounted on pedestal-type mounts 63. The radial struts are bolted to fan mounting rings 64 by studs which give an adjustable mounting.

A motor 66 is provided and drives the fans 12 through a transmission comprising a single duplex roller chain 67 which transmits power from an engine drive sprocket 68 to fan drive sprockets 69. An idler sprocket 71 is carried on a swinging arm 72 which is bolted to the motor 66 and provides a convenient chain tension adjustment by adjustment of the angular position of arm 72. The slack side of the chain 67 passes from the engine drive sprocket 68 and is threaded around the idler sprocket 71. In so doing an adequate angle of contact is achieved.

The motor 66, the transmission, the fans 12, fan mounting rings 64 and other fan and motor mounting equipment and the stators 13 are all mounted upon a base 73 which is a raft like platform and is itself supported on shock absorbing mountings so as to isolate engine and transmission vibrations from the rest of the vehicle. This method of supporting the whole of the machinery assembly on vibration absorbing mounts rather than supporting each vibration producing component separately on vibration absorbing mounts has the advantage of allowing the component of the machinery to be held in rigid, permanent and accurate alignment with one another. Further, of particular advantage is that the whole of the machinery may be removed as a unit.

The base 73 can, if desired, accomodate a multiple-engine installation or a single-engine of a different weight distribution but the choice of a single engine is more advantageous.

It is particularly to be noted that the machinery is located at the centre-of-area of the cushion and thus the weight of the machinery does not significantly affect the trim of the vehicle.

The compact arrangement and low profile of the machinery and duct assemblies enables an aesthetically pleasing body to be designed for the vehicle. Other important features of the body are low aerodynamic drag and, since all moving and potentially hazardous components of the machinery are covered, a high order of operational safety.

The body shape is so designed that there are no areas where any significant quantity of water, grass or sand can collect and this makes it easier to clean the body and avoids out of trim due to build up of contaminants. A section of the body is hingedly mounted so as to provide access to the machinery and to provide an opening through which the machinery, in toto, can be removed or installed.

Air intake apertures for the fans 12 are provided in the body and are covered with mesh 74 to prevent access during normal operation.

The above described vehicle is considered a particularly good example of its class and performance figures of a so constructed vehicle have been very pleasing.

It will be apparent to those skilled in the art that many modifications and variations may be made to the above described vehicle without departing from the spirit and scope of this invention and the invention is to be understood as encompassing within its ambit all such modification and variations.

We claim:
1. An air cushion vehicle comprising:
   a base;
   power supply means located on the base comprising two axial flow fans located on opposite sides of the fore-aft mid-line of the vehicle;
   stator means immediately downstream of said fans;
   two separate and independent duct systems each connected to and supplied, in use, by a respective one of said fans and located on opposite sides of said mid-line;
   splitter means positioned immediately downstream of said stator means for dividing each duct system into a propulsion duct and an air cushion duct;
   the propulsion ducts extending rearwardly to adjacent the rear end of the vehicle, said propulsion ducts being positioned laterally closer to the sides of said vehicle than the openings of the air cushion ducts to said fans, and said propulsion ducts converging towards their outlets to provide means to pressurize said air cushion ducts; and
   said air cushion ducts each including a first portion extending rearwardly and a second portion extending forwardly of the vehicle, said rearwardly extending portion including a diffuser debouching into a chamber of relatively large cross-sectional area intermediate said rearwardly and forwardly extending portions.

2. A vehicle as claimed in claim 1, wherein the forwardly extending portions of the air cushion ducts are at least in part defined by the base and a flexible material attached to the base.

3. A vehicle as claimed in claim 1, wherein the air cushion of the vehicle is defined at least in part by flexible skirt means, and that part of the air cushion on one side of the vehcile is substantially independant of that part of the air cushion on the other side of the vehicle.

4. A vehicle as claimed in claim 1, wherein the base has therein first apertures adapted to supply the air cushion, and wherein the vehicle includes a sheet of flexible material attached to and closely conforming to the underside of the base and having second apertures therein adapted to co-operate with the first apertures to supply the air cushion, and wherein the sheet has a plurality of depending skirts of flexible material attached thereto and surrounding the second apertures to define jupes.

5. A vehicle as claimed in claim 4, wherein there are a number of jupes on one side and a number of jupes on the other side of the vehicle; the jupes on said one side being supplied, in use, by one of said air cushion ducts and the jupes on said other side being supplied, in use, by the other of said air cushion ducts.

6. A vehicle as claimed in claim 1, further comprising a perimetric skirt depending from the base.

7. A vehicle as claimed in claim 6, further comprising means attached to said perimetric skirt transverse of the vehicle to inhibit against billowing out of said perimetric skirt laterally of the vehicle and to inhibit against longitudinal movement of air within the air cushion.

8. A vehicle as claimed in claim 1, further comprising cascade blading located at the outlet of each of the propulsion ducts and adapted to optionally act on air whereby to induce turning of the vehicle.

9. A vehicle as claimed in claim 1, further comprising flow reversing means adapted to optionally act on air issuing from one or both of the propulsion ducts whereby, in use, to cause air to be directed forwardly of the vehicle.

10. A vehicle as claimed in claim 9, wherein said reversing means includes at least one scoop which is pivotally mounted and movable from a first position out of interaction with air issuing from the propulsion ducts to a second position in which air is, in use, directed forwardly.

11. A vehicle as claimed in claim 10, and including one such scoop for each of the propulsion ducts; the scoops being operable independantly of one another.

12. A vehicle as claimed in claim 11, further comprising reversing control means comprising two members each independantly movable from a forward position in which a respective one of the scoops is in said first position to a rearward position in which a respective one of the scoops is in said second position.

13. A vehicle as claimed in claim 1, further comprising mounting means for a seat for an operator of the vehicle; the mounting means being positioned for movement fore and aft of the vehicle whereby, with the seat and operator, to vary the trim of the vehicle; and wherein at least part of control means for controlling the vehicle is mounted on the mounting means to be movable with the seat and operator fore and aft of the vehicle.

14. A vehicle as claimed in claim 1, wherein the base is so shaped to provide means for causing shipped water to flow to vent means adapted to pass such shipped water out of the vehicle.

15. A vehicle as claimed in claim 14, wherein the vent means includes a flexible flap which is normally, in use, closed by cushion air pressure but which is openable by pressure of shipped water thereabove.

16. A vehicle as claimed in claim 1, further comprising a skirt depending from said base; supports for the vehicle located on the underside of the base; said supports being so constructed and arranged and said skirt means being so constructed and arranged that in no position that the skirt means may take up does the skirt means underlie said supports.

17. A vehicle as claimed in claim 4, wherein supports which are skid pads are located within the jupes.

18. A vehicle as claimed in claim 1, wherein the power supply means additionally comprises a motor adapted to drive the fans and wherein the motor, fans and stator means are mounted as a unit which is separable from the vehicle, located generally amidships of the vehicle and in communication with said duct systems.

* * * * *